(12) United States Patent
Glienicke

(10) Patent No.: US 6,224,221 B1
(45) Date of Patent: May 1, 2001

(54) ILLUMINATED ROTATABLE KNOB

(75) Inventor: Haiko Glienicke, Salz (DE)

(73) Assignee: Preh-Werke GmbH & Co. KG, Bad Neustadt/Saale (DE)

( * ) Notice: Subject to any disclaimer, the term of this patent is extended or adjusted under 35 U.S.C. 154(b) by 0 days.

(21) Appl. No.: 09/343,727

(22) Filed: Jun. 30, 1999

(30) Foreign Application Priority Data

Jul. 30, 1998 (DE) .............................. 198 34 374

(51) Int. Cl.[7] .................................................. G01D 11/28
(52) U.S. Cl. .............................. 362/23; 362/29; 362/30; 116/286; 116/DIG. 36
(58) Field of Search .................................. 362/5, 28, 29, 362/30; 116/286, 287, 288, DIG. 36, DIG. 5

(56) References Cited

U.S. PATENT DOCUMENTS

| | | | |
|---|---|---|---|
| 1,566,069 | * 12/1925 | Buchholz et al. | 200/316 |
| 2,999,148 | * 9/1961 | Kay | 116/287 |
| 4,215,647 | * 8/1980 | Fukasawa | 116/286 |
| 4,646,206 | * 2/1987 | Bauer et al. | 362/32 |
| 5,697,689 | * 12/1997 | Levine et al. | 362/26 |

FOREIGN PATENT DOCUMENTS

| | | |
|---|---|---|
| 21 38 660 | 3/1973 | (DE) . |
| 35 35 881 C2 | 4/1987 | (DE) . |
| 40 22 515 A1 | 1/1992 | (DE) . |
| 197 12 294 A1 | 10/1998 | (DE) . |

* cited by examiner

Primary Examiner—Stephen Husar
Assistant Examiner—John Anthony Ward
(74) Attorney, Agent, or Firm—Birch, Stewart, Kolasch & Birch, LLP

(57) ABSTRACT

A rotatable knob for a control apparatus which is less complex than similar devices and which provides greater self-illumination than do similar devices. In the case of the present rotatable knob, a total reflection surface (13) is established wherein the obverse side (14) of the total reflection surface (13) forms a mantle of a conical or cup-shaped frustum upon which segment-like 90° prisms (16) are radially arranged. Accordingly, the present rotatable knob may be used in operational components for radios, air conditioning units, and the like in motor vehicles.

5 Claims, 1 Drawing Sheet

ILLUMINATED ROTATABLE KNOB

FIELD OF THE INVENTION

This invention relates to rotatable knobs suitable for use with such electric and/or electronic appliances as radios, air conditioners, and the like, particularly in motor vehicles.

BACKGROUND OF THE INVENTION

Illuminated rotatable knobs are disclosed in DE 35 35 881 C2 which describes an illumination apparatus formed from several light conductors and in which the position of the rotatable knob is indicated by corresponding illumination of a scale. This apparatus was developed especially for installation in a motor vehicle. However, a loss of light is incurred by the twisting of the light conductors while using the rotatable knob. Further, the lighting arrangement is very complex in its design.

DE 197 12 294.9 of Preh-Werke GmbH & Co. KG (the assignee of the present invention), published on Oct. 1, 1998, discloses a rotatable knob of a rotary potentiometer comprising a light-transmitting body. A light entry surface is designed in the rotational center thereof, ahead of which a light source is placed. In this case, the light-transmitting body is bounded in its peripheral area with a transparent housing part. This transparent housing part carries a scale visible from the outside. A transparent, light-conducting annulus with a path of light such that a total reflection surface is created, by which the path of the light beams is diverted, is placed between the peripheral area of the light-transmitting body of the rotatable knob and the scale. Again, in this case, experience shows that only a weak illumination of the scale is achieved.

SUMMARY OF THE INVENTION

It is an object of this invention to provide a generic rotatable knob having improved scale illumination. It is another object of the present invention to provide a simplified and improved rotatable knob design that is suitable for mass production.

These and other objects are achieved with a rotatable knob of a control apparatus with electric and/or electronic components and an illuminating arrangement. The knob assembly comprises a light source positioned before a first light-transmitting body situated within the rotatable knob and possessing a light entry surface arranged in the rotational center thereof and terminating with its peripheral portion within a transparent housing part that includes an externally visible scale.

In accordance with this invention, the transparent housing part of the rotatable knob contains a second light-transmitting body fixed in the housing. This second light-transmitting body is disposed between the scale and a peripheral area of the first light-transmitting body. This second light-transmitting body comprises a total reflection surface in its light path, which total reflection surface comprises an outer face forming an envelope of a conic or cup-shaped frustum on which segment-shaped 90° prisms are arranged. The conic or cup-shaped frustum may lie within an angle adjusted with respect to a given light output beam from the second light-transmitting body.

In accordance with a preferred feature of the present invention, the first light-transmitting body may comprise a light output area which effects a light output beam in a direction of a translucent zone with a pointer mark in the rotatable knob.

In another preferred embodiment, the first light-transmitting body and the second light-transmitting body may contain light-diffusing particles.

BRIEF DESCRIPTION OF THE DRAWINGS

The invention is described and explained in more detail below with reference to a specific embodiment shown in the drawings. The described and drawn figures can be used individually or in preferred combinations in other embodiments of the invention. The drawings are not necessarily to scale, emphasis instead being placed upon illustrating principles of the invention in a clear manner.

DETAILED DESCRIPTION OF THE INVENTION

Figure 1:
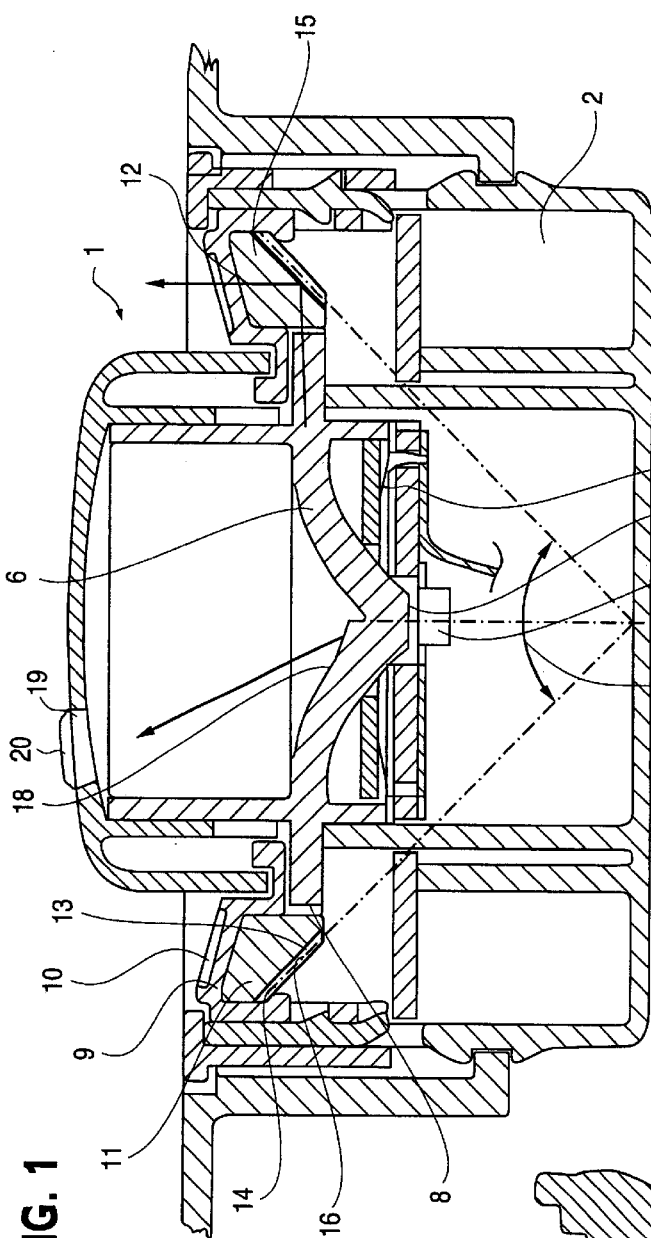
FIG. 1 is a sectional view through a rotatable knob assembly of the present invention.

The above and other objects, features, and advantages of the invention will be apparent from the following more particular description of a preferred embodiment thereof, as illustrated in the accompanying drawings in which reference characters refer to the same parts throughout the different views.

FIG. 1 presents a section through a rotatable knob assembly 1 of this invention. Rotatable knob 1 possesses a control apparatus 2, which apparatus possesses electrical and/or electronic components 3 and an illumination arrangement 4 comprised of a source of light 5 situated in position before a light-transmitting body 6 located within the rotatable knob 1 with a light entry surface 7 placed on the rotational centerline thereof.

In this arrangement, the light-transmitting body 6 terminates with its peripheral part 8 in a transparent housing section 9. This housing section 9 includes a scale 10, visible from outside of the apparatus, and also a light-transmitting body 11 of the rotatable knob 1 firmly emplaced in the housing section 9 between the scale 10 and the peripheral part 8 of the light-transmitting body 6. The light-transmitting body 11 provides a total reflection surface 13 in its path of light 12 (arrow).

Rotatable knob 1 is constructed so that the total reflection surface 13, with its externally situated side 14, forms a conical or cup-shaped frustum 15 upon which segmentally shaped surface of 90° prisms 16 are imposed. The orientation of the longitudinal axes of the prisms 16 is radial to the center of rotation of the rotatable knob 1.

Figure 2:
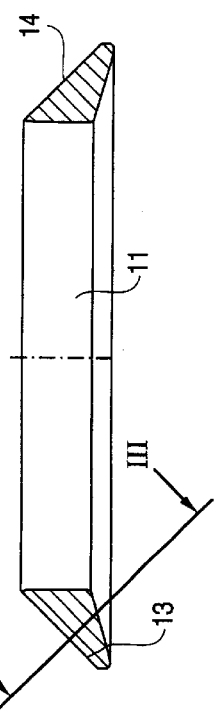
FIG. 2 depicts a light-transmitting body employed in the present invention.
Figure 3:
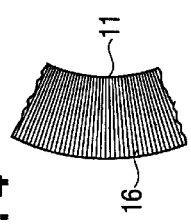
FIG. 3 presents a perspective view of the 90° prisms of this invention.
Figure 4:
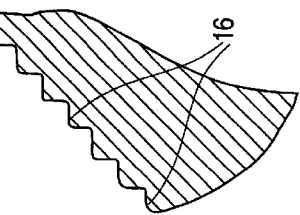
FIG. 4 is a plan view of the 90° prisms of the invention.

From FIG. 2 it can be seen that the light-transmitting body 11, which may take the form of an annulus, possesses a triangular cross-section. In a section therethrough, FIG. 3 presents the said prisms in easily recognizable form. FIG. 4 shows a plan view, in which the segmentally shaped 90° prisms on the outer side 14 can be seen.

An arrangement is particularly advantageous if the reflecting surface 13 is related to the plane of the scale 10 so that the elements of the conical or cup-shaped frustum 15 lie within a 90° angle 17, as illustrated in FIGS. 1 and 2. More advantageous still would be a precise arrangement providing a predetermined direction of emerging beam from the light-transmitting body 11. To simplify manufacture and to improve the serviceability of the rotatable knob 1, the light-transmitting body 6 of the rotatable knob 1 may possess a light emergence direction (arrow) which acts to illuminate a translucent area 19 with a pointer projection 20 in the rotatable knob 1, as is shown in FIG. 1.

To avoid shadow formation from internal parts of the rotatable knob 1, the light-transmitting body 6 and the light-transmitting body 11 can contain light diffusion particles. For this purpose, the manufacture of the light-transmitting bodies 6, 11 from the material Plexi® (available from the firm Röhm) is advantageous. By this means, a good readability is achievable for the position of the rotatable knob 1 without extra symbols on the scale permanently located on the housing 10.

The design of the rotatable knob 1 and its illumination arrangement 4 permit the installation of the rotatable knob in control apparatuses 2, which are installed as operating components of radios, air conditioners, and the like in motor vehicles.

What is claimed is:

1. A rotatable knob of a control apparatus with electric components and an illuminating arrangement, comprising a light source which is positioned before a first light-transmitting body, said first light-transmitting body being situated within the rotatable knob, possessing a light entry surface arranged at a rotational center of said rotatable knob and having a peripheral light-output portion which terminates within a transparent housing part, said transparent housing part comprising an externally visible scale, wherein said transparent housing part further contains a second light-transmitting body fixed in the transparent housing, which second light-transmitting body is disposed between the scale and the peripheral light output portion of the first light-transmitting body, and wherein said second light-transmitting body comprises a total refection surface in a light path of light traveling from said light output part to said scale, which total reflection surface comprises an outer face forming an envelope of a cup-shaped frustum on which segment-shaped 90° are arranged.

2. The rotatable knob of claim 1, wherein the cup-shaped frustum lies within an angle determined to provide a given light output beam from the second light-transmitting body.

3. The rotatable knob of claim 1, wherein the first light-transmitting body comprises a further light output area which effects a light output beam in a direction of a translucent zone with a pointer mark in the rotatable knob.

4. The rotatable knob of claim 1, wherein the first light-transmitting body and the second light-transmitting body contain light-diffusing particles.

5. The rotatable knob of claim 1 wherein the cup-shaped frustum has a conical shape.

* * * * *